(12) United States Patent
Niiya

(10) Patent No.: US 10,634,521 B2
(45) Date of Patent: Apr. 28, 2020

(54) SCALE DEVICE AND TWO-AXIS DISPLACEMENT DETECTION DEVICE

(71) Applicant: DMG MORI CO., LTD., Nara (JP)

(72) Inventor: Masayuki Niiya, Kanagawa (JP)

(73) Assignee: DMG MORI CO., LTD., Nara (JP)

( * ) Notice: Subject to any disclaimer, the term of this patent is extended or adjusted under 35 U.S.C. 154(b) by 246 days.

(21) Appl. No.: 15/957,660

(22) Filed: Apr. 19, 2018

(65) Prior Publication Data
US 2018/0313671 A1    Nov. 1, 2018

(30) Foreign Application Priority Data

Apr. 27, 2017  (JP) .................................. 2017-088413

(51) Int. Cl.
*G01D 5/26* (2006.01)
*G01D 5/347* (2006.01)
*G01D 5/245* (2006.01)

(52) U.S. Cl.
CPC ......... *G01D 5/266* (2013.01); *G01D 5/34715* (2013.01); *G01D 5/34776* (2013.01); *G01D 5/34792* (2013.01); *G01D 5/2457* (2013.01)

(58) Field of Classification Search
CPC ............... G01D 5/266; G01D 5/34715; G01D 5/34776; G01D 5/34792; G01D 5/2457
See application file for complete search history.

(56) References Cited

U.S. PATENT DOCUMENTS 3,982,948 A     9/1976 Sato et al.
2016/0161292 A1*  6/2016 Rohner ................ G01D 5/2415
                                                         324/662

FOREIGN PATENT DOCUMENTS

JP          5023618 A     3/1975
JP       2004-170153 A    6/2004
JP       2014-134532 A    7/2014

* cited by examiner

*Primary Examiner* — Georgia Y Epps
*Assistant Examiner* — Don J Williams
(74) *Attorney, Agent, or Firm* — Cozen O'Connor

(57) ABSTRACT

Disclosed embodiments include a two-dimensional scale with a simple arrangement capable of omitting setting of an origin mark in the Y-axis direction. In a linear scale, a reference origin mark array and a tilting origin mark array that is a tilting marker array are provided in an origin mark region. Since the reference origin mark array is parallel to X-coordinates, an X-direction origin signal is correctly generated. On the other hand, for the Y direction in which no origin mark is provided, the distance between a reference origin mark and a tilting origin mark is detected. A Y-direction absolute position is decided in accordance with the distance.

20 Claims, 16 Drawing Sheets

TO ROW-DIRECTION
ADDRESS COUNTER

X-AXIS CORRECTION TABLE

COLUMN-DIRECTION
ADDRESS COUNTER

|     | −40 | −30 | −20 | −10 | 0 | 10 | 20 | 30 | 40 |
|-----|-----|-----|-----|-----|---|----|----|----|----|
| 40  | 0   | 2   | 1   | 0   | 0 | 0  | −1 | −2 | 0  |
| 30  | 2   | 2   | 2   | 1   | 0 | −1 | −2 | −2 | −2 |
| 20  | 3   | 3   | 3   | 1   | 0 | −1 | −3 | −3 | −3 |
| 10  | 3   | 4   | 3   | 2   | 0 | −2 | −3 | −4 | −3 |
| 0   | 4   | 4   | 3   | 2   | 0 | −2 | −3 | −4 | −4 |
| −10 | 3   | 4   | 3   | 2   | 0 | −2 | −3 | −4 | −3 |
| −20 | 3   | 3   | 3   | 1   | 0 | −1 | −3 | −3 | −3 |
| −30 | 2   | 2   | 2   | 1   | 0 | −1 | −2 | −2 | −2 |
| −40 | 0   | 2   | 1   | 0   | 0 | 0  | −1 | −2 | 0  |

F I G. 13A

TO ROW-DIRECTION
ADDRESS COUNTER

Y-AXIS CORRECTION TABLE

COLUMN-DIRECTION
ADDRESS COUNTER

|     | -40 | -30 | -20 | -10 | 0  | 10 | 20 | 30 | 40 |
|-----|-----|-----|-----|-----|----|----|----|----|----|
| 40  | 0   | -2  | -3  | -3  | -4 | -3 | -3 | -2 | 0  |
| 30  | -2  | -2  | -3  | -4  | -4 | -4 | -3 | -2 | -2 |
| 20  | -1  | -2  | -3  | -3  | -3 | -3 | -3 | -2 | -1 |
| 10  | 0   | -1  | -1  | -2  | -2 | -2 | -1 | -1 | 0  |
| 0   | 0   | 0   | 0   | 0   | 0  | 0  | 0  | 0  | 0  |
| -10 | 0   | 1   | 1   | 2   | 2  | 2  | 1  | 1  | 0  |
| -20 | 1   | 2   | 3   | 3   | 3  | 3  | 3  | 2  | 1  |
| -30 | 2   | 2   | 3   | 4   | 4  | 4  | 3  | 2  | 2  |
| -40 | 0   | 2   | 3   | 3   | 4  | 3  | 3  | 2  | 0  |

FIG. 13B

SCALE DEVICE AND TWO-AXIS DISPLACEMENT DETECTION DEVICE

CROSS-REFERENCE TO RELATED APPLICATION

This application is based upon and claims the benefit of priority from Japanese patent application No. 2017-088413, filed on Apr. 27, 2017, the disclosure of which is incorporated herein in its entirety by reference.

BACKGROUND OF THE INVENTION

Field of the Invention

The disclosed embodiments relate to a displacement detection device used to perform positioning and detect a displacement amount in a linear direction in a machine tool, industrial machinery, a robot, or the like, and a scale device used in the displacement detection device.

Description of the Related Art

Conventionally, to detect a linear moving amount or a linear position for positioning, control, position display, or the like of a machine tool, industrial machinery, a robot, or the like, a displacement detection device including a scale and a detection head is used. Recently, there is also proposed a displacement detection device that detects not only the displacement (moving) amount of a detection head but also an origin mark using a vernier type scale, thereby detecting the absolute position of the detection head with respect to the scale.

The techniques of displacement detection are roughly classified into magnetic types (patent reference 1) and optical types (patent references 2 and 3).

On the other hand, as for a displacement detection device of this type, along with the diversification of machining application fields, to detect a displacement in a two-dimensional planar region (for example, X and Y directions), a position detection device has also been developed, which includes an X-axis linear scale provided while extending in the X direction on a two-dimensional planar region, a Y-axis linear scale extended in the Y direction orthogonal to the linear scale, and read heads that independently read the "scales" of these linear scales and scan the X-axis linear scale and the Y-axis linear scale by independently following the movements of the actuator of a processing apparatus in the two-dimensional directions.

In particular, to detect a position and detect a displacement amount at an accuracy of nm order, optical types (phase difference methods) have been recently proposed and executed (patent references 2 and 3).

In the magnetic type when detecting an origin signal, a magnetic origin marker independent of a linear scale is provided and read.

In addition, an optical position detection device includes a scale on which a first region where pieces of position information are recorded at a predetermined interval and a second region where pieces of position information are recorded at an interval different from the first region are formed. Furthermore, a displacement detection device described in each of patent references 2 and 3 includes a first reading means for reading position information in a first region, and a second reading means for reading position information in a second region.

In the displacement detection device described in each of patent references 2 and 3, when the difference between a first phase detected by reading the position information in the first region and a second phase detected by reading the position information in the second region becomes an arbitrarily set value, an origin signal is generated. The absolute position of the detection head is detected using the origin signal as a reference. That is, the displacement detection device described in each of patent references 2 and 3 arbitrarily forms an origin mark in accordance with the phase difference between the first region and the second region.

[Patent Reference 1] Japanese Patent Publication No. 50-23618
[Patent Reference 2] Japanese Patent Laid-Open No. 2004-170153
[Patent Reference 3] Japanese Patent Laid-Open No. 2014-134532

SUMMARY OF THE INVENTION

In these conventional two-dimensional position detection devices that do not use a phase difference, however, an origin signal mark needs to be provided in each of the X and Y directions to detect an absolute position in each of the X and Y directions, in both the magnetic and optical types. This leads to an increase in cost.

Additionally, in the conventional optical type of detecting a "pseudo" origin by detecting a phase difference, an origin mark independent of a linear scale need not be provided. However, particularly, in patent reference 2 or 3, an absolute position is "a specific one of a plurality of pieces of relative position information, which is relative rather than "absolute" position information" generated in one pitch of an optical grid, and does not exhibit absolute correctness.

Furthermore, in the optical scale device or displacement detection device using the phase difference method, two optical systems are required to detect the origin even for one axis. The situation is the same in a scale device using a magnetic head as well because it needs two magnetic heads.

The disclosed embodiments enable to propose a two-dimensional displacement detection device and a scale device, each of which enables, using origin detection for a linear scale of one axis (for example, the X direction), detection of the absolute position of a linear scale of the other axis (for example, the Y direction) in two-dimensional displacement detection.

The disclosed embodiments also enable to propose a two-dimensional displacement detection device capable of generating an absolute position on the X-axis by performing detection of an "origin mark" on the X-axis, generating an absolute position on the Y-axis based on the detected origin mark on the X-axis, and the like, and generating correction data for correcting an optical distortion of a linear scale at the time of the manufacture based on the generated absolute positions on the X- and Y-axes, thereby correcting a "position information signal".

The disclosed embodiments also enable to propose a scale device or a displacement detection device, which can detect whether the direction of the traveling path or scanning path of the axis of a scale deviates from a coordinate axis or not using a technique of detecting absolute positions on two axes using origin detection of one axis.

One example aspect of the disclosed embodiments provides a scale device including a linear scale that is scanned and generates a signal for detecting a coordinate position in an X-axis direction. The scale device further includes a reference origin mark array that is an origin mark array in which a plurality of origin marks that are detected to generate a reference origin signal representing a coordinate origin of an X-axis, the reference origin mark array extending on a second plane parallel to a first plane formed by the linear scale and extending in a Y-axis direction orthogonal to the X-axis direction. The scale device further includes a first tilting origin mark array provided while extending at a tilting angle so as to be non-parallel to the reference origin mark array on the second plane; and a read head that scans on the linear scale, the read head sequentially crossing the reference origin mark array and the first tilting origin mark array and reading the origin marks on the reference origin mark array along with a movement.

Another example aspect of the disclosed embodiments provides a two-axis displacement detection device to which the above scale device is connected, wherein when a read head scans a linear scale in an X-axis direction, the read head outputs a relative position information signal representing a current scan position in the X-axis direction, and the read head is movably arranged at an arbitrary Y-coordinate position in a Y-axis direction. The two-axis displacement detection device includes a unit that counts a relative distance between a set of a reference origin mark and a tilting origin mark at an arbitrary Y-axis position by scanning, at the arbitrary Y-coordinate position, between a reference origin mark array and a first tilting origin mark array in the X-axis direction; and a unit that calculates an absolute Y-axis position at the arbitrary Y-axis position in accordance with the relative distance between the set of the reference origin mark and the tilting origin mark at the arbitrary Y-axis position.

According to the displacement detection device and the scale of disclosed embodiments, since the "absolute position" based on the origin mark can be detected even for the Y-axis where no origin mark is provided, the accuracy of the detected absolute position information is kept almost equal to that in a device including an origin mark on the Y-axis. In addition, since the setting of the origin mark for the Y-axis direction can be eliminated, cost reduction can be achieved.

BRIEF DESCRIPTION OF THE DRAWINGS

FIG. 13A is a view showing an example of correction data used in the third example embodiment; and FIG. 13B is a view showing another example of correction data used in the third example embodiment.

DESCRIPTION OF THE EXAMPLE EMBODIMENTS

Figure 1:
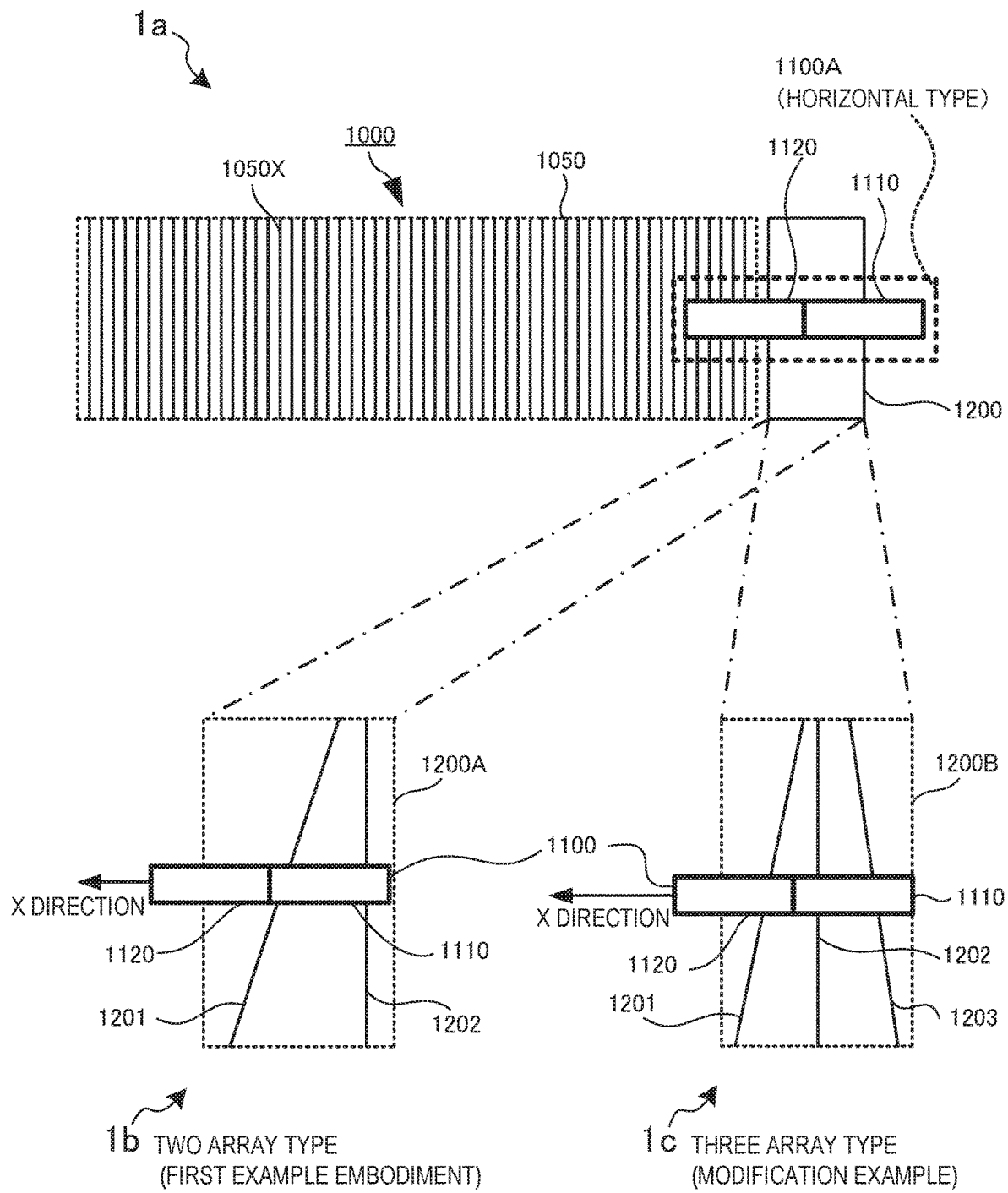
FIG. 1 is a schematic view showing the arrangement and operation of a scale device or a two-dimensional displacement detection device according to the first example of the first example embodiment (one-dimensional scale 1a), in which portion 1b of FIG. 1 is a view showing two origin mark arrays serving as a means for compensating for an absolute position for a Y direction without an origin mark detection function, and portion 1c of FIG. 1 is a view for explaining a mechanism and a function that detect that the moving direction of a head tilts with respect to a coordinate axis in the scale device according to the first example embodiment.

Example embodiments will now be described in detail with reference to the drawings. It should be noted that the relative arrangement of the components, the numerical expressions and numerical values set forth in these example embodiments do not limit the scope of the present invention unless it is specifically stated otherwise.

All of a plurality of example embodiments and examples to be described below are directed to optical scales using interference of light. However, in a today's displacement detection technique using a scale, a phase difference on signal propagation at a short distance causes interference in both a magnetic type and an optical type. Hence, an optical head of each of the example embodiments and examples to be described below in this specification attains compatibility between the optical type and the magnetic type by normal type change performed between them. A portion concerning an optical technology of the disclosed embodiments can substantially be applied to a magnetic head as well. For this reason, it needs to be specified that the scope of the claims includes, inter alia, the optical read heads of the example embodiments and examples, needless to say, and also includes the magnetic type.

In this specification, a scale or a scale device means a device serving as a unit that outputs position information or displacement information in the form of a physical signal (for example, an electric signal, an optical signal, a magnetic signal, or a radio wave signal) using a scale such as a linear scale. A "displacement detection device" indicates a device that receives a signal output from the above-described "scale" or "scale device" that has detected a motion of an "object" as a physical signal, and recognizes the real-time position, displacement, or change of the object as position information, in which the principle of recognition processing of the device is closely related to the principle of the "scale" or "scale device".

Additionally, in this specification, terms such as "X-axis", "Y-axis", "X direction", and "Y direction" are used for the descriptive convenience. However, X and Y are not be interpreted as only two axes on a horizontal plane in a narrow sense, that is, the Z-axis is not excluded. In this specification, X and Y include not only the X- and Y-axes parallel to the horizontal plane but also a vertical axis (Z-axis) direction. That is, "X and Y" in "X and Y directions" and "X- and Y-axes" are generally not inconsistent with or different from "first" or "second" "direction" or "axis" in a broad sense at all. That is, in this specification, "X and Y" only have a meaning "first and second" in a broad sense.

First Example Embodiment

<Linear Scale and Displacement Detection Device of First Example Embodiment>

A displacement detection device according to the first example embodiment will now be described with reference to FIG. 1, FIG. 2, and the like.

A linear scale 1000 according to this example embodiment includes a grid region 1050 of an X-axis scale in which a number of grids each extending in a Y-axis direction orthogonal to an X direction are arrayed at an equal small interval from an X-direction origin in the X direction to measure a displacement or position in the X direction, an origin mark array region 1200 in which two (or more) origin mark arrays used to detect the origin in the X-axis direction are arrayed, and a head assembly 1100A formed from two read heads connected to each other, in which one read head 1110 reads an origin mark on an origin mark array, and the other read head 1120 reads the grid region 1050 of the X-axis scale.

Figure 2:
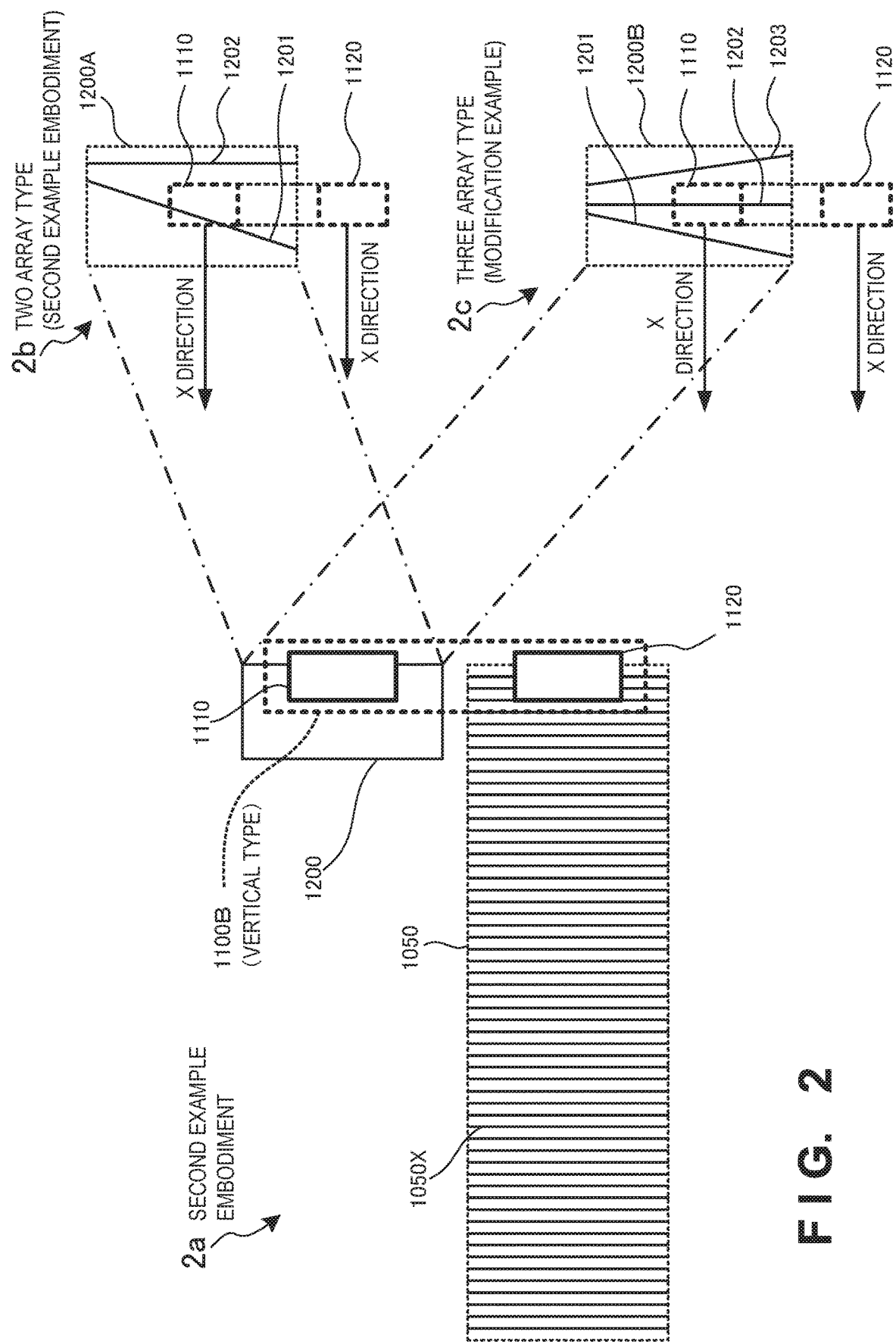
FIG. 2 is a schematic view showing the arrangement and operation of a scale device or a two-dimensional displacement detection device according to the second example embodiment (portion 2a), in which portions 2b and 2c of FIG. 2 are the same as those of FIG. 1 (first example embodiment)

As shown in (a) of portion 1a of FIG. 1, scale grids 1050X are n grids. When the read head 1120 detects the position of each grid, the position or displacement of the read head 1120 is detected. That is, each of the scale grids 1050X is formed from an optical grid extending in the Y direction. A number of such grids are formed in the X direction at an equal interval. That is, the linear scale 1000 according to this example embodiment includes the scale grid region 1050 where the X-axis scale 1050X in which a number of grids for a linear scale are formed is set, and the region 1200 where a predetermined number of origin mark arrays are set at a position adjacent to the scale grid region 1050 on the same plane as the scale grid region 1050.

As shown in portion 1a of FIG. 1, the origin mark array region 1200 is provided on a side close to the origin of the scale grid region 1050 at a position adjacent to the scale grid region 1050. That is, the scale grid region 1050 of the linear scale 1000 according to this example embodiment and the origin mark array region 1200 are arrayed to be adjacent along the X-axis.

In the origin mark array region 1200, one reference origin mark array 1202 orthogonal to the X-axis and a tilting origin mark array 1201 tilting with respect to the reference origin mark array 1202 (that is, with respect to the X-coordinate axis) are formed.

In portion 1a of FIG. 1, reference numeral 1100A denotes the read head assembly including the origin mark read head 1110 and the read head 1120. As described above, the scale grid region 1050 and the origin mark array region 1200 are arranged while being juxtaposed in the X-axis direction, and both the (origin mark array) read head 1110 and the (grid) read head 1120 are arranged while being juxtaposed along the X-axis. The (origin mark array) read head 1110 is moved to read the origin mark array in the origin mark array region 1200. On the other hand, the (grid) read head 1120 is moved to read a grid. For this reason, when the (origin mark array) read head 1110 moves along the X-axis in the X direction, traverses the origin mark arrays 1201 and 1202, and detects the origin, the (grid) read head 1120 reliably reads a grid in the scale grid region 1050. Accordingly, the detection operation of a grid point and the detection operation of the origin are reliably performed in parallel.

As a feature of the linear scale 1000, the separate tilting origin mark array 1201 different from the reference origin mark array 1202 is provided, and the extending direction of the tilting origin mark array 1201 is "not parallel", that is, "tilts" with respect to the reference origin mark array 1202. When the (origin mark array) read head 1110 moves in the X-axis direction in the origin mark array region 1200, for example, when the read head 1110 moves from right to left on the sheet surface of portion 1b of FIG. 1, the read head 1110 sequentially traverses the reference origin mark array 1202 and the tilting origin mark array 1201 (see 1200A). That is, the read head 1110 recognizes that it has moved by the traverse distance from the position to traverse the reference origin mark array 1202 to the position to traverse the tilting origin mark array 1201. The "length" of the distance from the crossing position on the reference origin mark array 1202 to the crossing position on the tilting origin mark array 1201 uniquely depends on the Y-coordinate position at which the read head 1110 traverses. When the traverse distance is known, the absolute position of the Y-coordinate of the traverse operation of the head assembly 1100A can be known indirectly from the "value" of the traverse distance.

The principle of Y-direction absolute position detection by the displacement detection device according to this example embodiment will be described with reference to FIG. 3.

Figure 3:
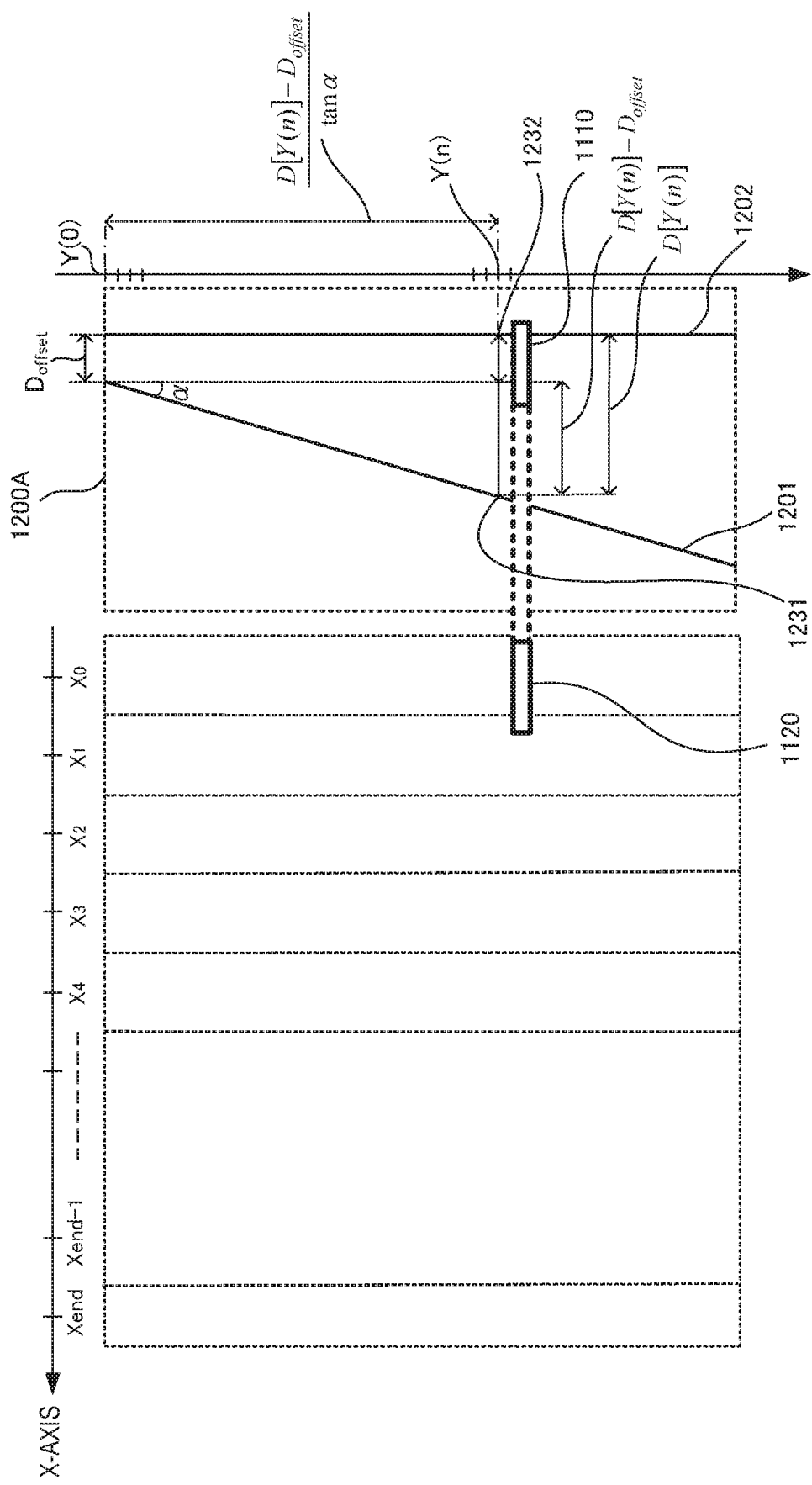
FIG. 3 is a view for explaining the principle of obtaining an absolute position for position information or displacement information by detecting an origin mark even if an origin mark array is not provided in the first to third example embodiments.

Referring to FIG. 3, the read head 1120 that reads the scale grid and the read head 1110 that reads the origin mark array are integrally scanned and moved. The moving locus of the integral head (1110 and 1120) crosses the reference origin mark array 1202 and the tilting origin mark array 1201 at crossing positions 1232 and 1231, respectively, on a line passing through a Y-coordinate position Y(n).

A tilt angle α of the tilting origin mark array 1201 with respect to the Y-axis is permanently set and known at the time of manufacturing of the linear scale 1000. An offset distance Doffset of the tilting origin mark array 1201 to the reference origin mark array 1202 at an unknown Y-coordinate position Y(o) is also known.

Hence, the Y-coordinate position Y(n) of the read head 1110 at the present time can be expressed by an absolute position expression as $$\frac{D[Y(n)] - D_{offset}}{\tan\alpha} \tag{1}$$

As described above, when the head 1110 moves along the moving locus, the (scale grid) read head 1120 reads the grids while moving on the grid in the scale grid region 1050. For this reason, the read head 1120 outputs a sin signal and a cos signal (to be described later). A moving distance D[Y(n)] at the absolute position Y(n) in the Y direction can be obtained from an "increment signal" generated from the sin signal and the cos signal output from the read head 1120.

According to this example embodiment shown in portions 1a and 1b of FIG. 1, the (origin mark array) read head 1110 traverses the two origin mark arrays (1202 and 1201) for the X-axis used to generate the origin signal for the X-axis direction. In addition, the timing of origin detection for the Y-axis can be known from the traverse distance of the traverse. As a result, the absolute position of the head assembly 1110 on the Y-axis can be known.

The linear scale 1000 according to this example embodiment is applicable even after the arrangement is modified. That is, the linear scale 1000 and the displacement detection device according to this example embodiment can be applied not only to an optical linear scale but also to a magnetic linear scale.

In addition, all the grids of the scale grid region 1050 are arranged at an equal interval. However, for example, modulation (see, for example, FIG. 13B) according to the quadratic function of the X-direction coordinate value X according to the third example embodiment to be described later may be performed for the pitch interval of the grid for each position X of the grid in accordance with the X-axis position.

<Modification of First Example Embodiment (First Example)>

Defining the linear scale having the arrangement shown in portions 1a and 1b of FIG. 1 as the first example of the first example embodiment, a linear scale according to a modification (second modification example) of the first example will be described with reference to portion 1c of FIG. 1.

Second Modification Example of First Example

In the linear scale 1000 and the displacement detection device according to this example embodiment, the scan direction of the heads is assumed to be parallel to the X-axis. In the actual working scene, the scan direction deviates from the X-axis direction due to aged deterioration. Additionally, in the actual working scene, a state in which the scan direction is not parallel to the X-axis direction can also be demanded. Furthermore, depending on the application field of the linear scale, scanning may be performed while intentionally tilting the scan direction with respect to the X-axis (by an angle $\gamma$). A Y-direction absolute position detected in accordance with the method of the first example embodiment without considering the tilt of the scan direction with respect to the X-axis includes an error, as a matter of course.

The second modification example shown in portion 1c of FIG. 1 aims at confirmatively detecting that the tilt angle $\gamma$ is not zero (deviates from a level).

Figure 4:
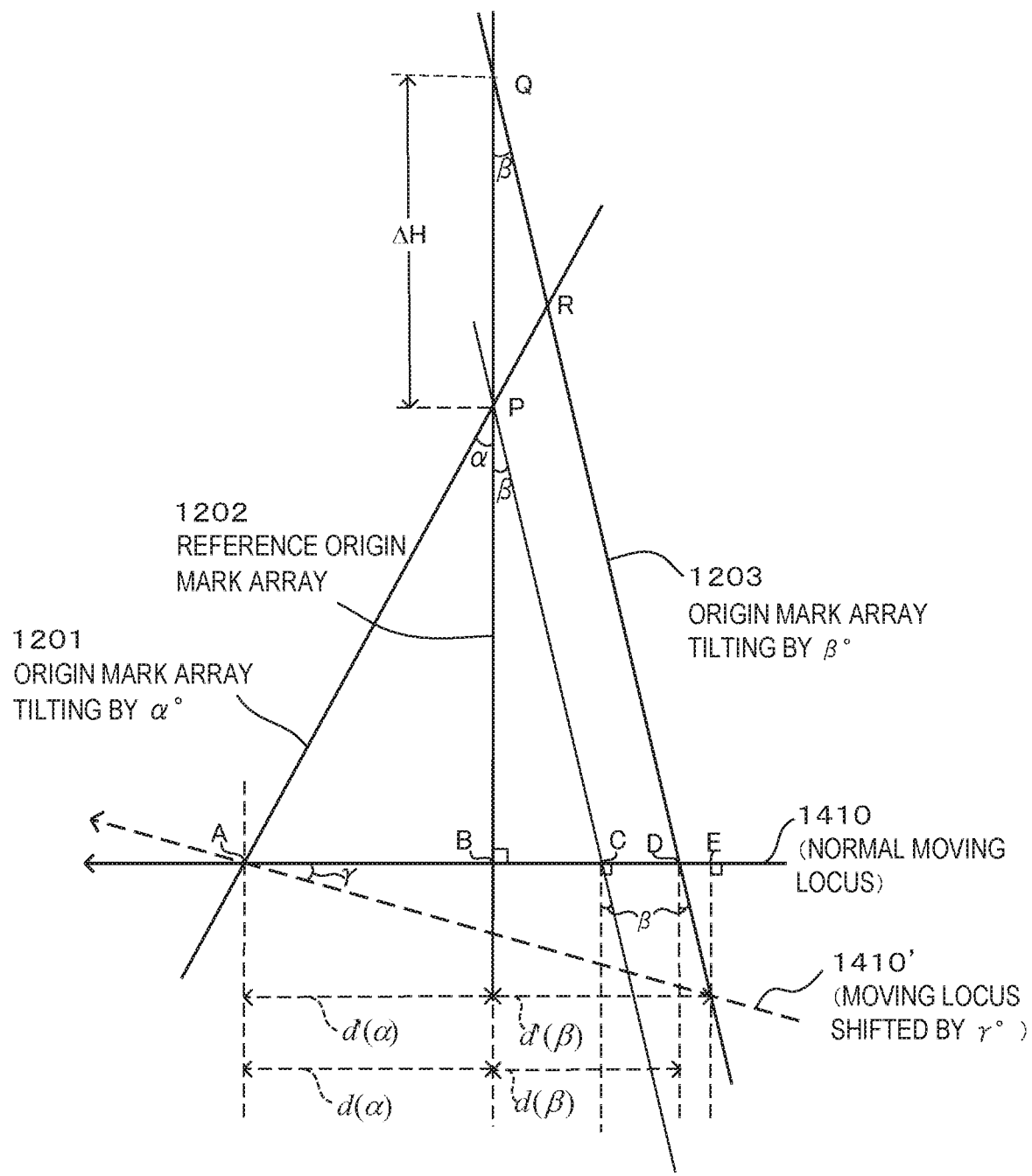
FIG. 4 is a view for explaining the principle of detecting that the moving direction of a head deviates from a coordinate axis in the first to third example embodiments.

As a characteristic feature of the second modification example, an additional tilting origin mark array 1203 is provided in the linear scale 1000 according to the first example (portion 1b of FIG. 1) of this example embodiment. That is, the operation of a linear scale origin mark array region 1200B according to the second modification example (portion 1c of FIG. 1) is shown in FIG. 4. In addition to the reference origin mark array 1202 and the (first) tilting origin mark array 1201 tilting with respect to the Y-axis by the angle $\alpha$ in the linear scale 1000 (portion 1b of FIG. 1) according to the first example embodiment (first example), the (second) tilting origin mark array 1203 similarly tilting with respect to the Y-axis by an angle $\beta$ is provided. Here, the angles $\alpha$ and $\beta$ may be equal or different.

In FIG. 4, reference numeral 1410 denotes a moving locus of the read head 1110 "in a normal state" (when no deviation has occurred); and 1410', a moving locus of the read head 1110 "in an abnormal state" (when a deviation has occurred).

In FIG. 4, the angles $\alpha$ and $\beta$ are known set angles that are recognized at the time of manufacturing of the linear scale 1000 or a two-dimensional scale. Similarly, once the first tilting origin mark array 1201 and the second tilting origin mark array 1203 are provided, they are never removed then. Hence, a distance $\Delta H$ between crossing points P and Q at which the reference origin mark array 1202 crosses the first tilting origin mark array 1201 and the second tilting origin mark array 1203, respectively, is also known.

In addition, in a case in which the read head 1110 sequentially crosses the second tilting origin mark array 1203, the reference origin mark array 1202, and the first tilting origin mark array 1201 at points D, B, and A along the moving locus 1410 in the normal state, a distance $d(\alpha)$ between the points A and B and a distance $d(\beta)$ between the points B and D are unknown because the moving locus 1410 itself cannot be specified. However, since the moving locus 1410 is always orthogonal to the Y-coordinate axis, the ratio of the distance $d(\alpha)$ between the points A and B to the distance $d(\beta)$ between the points B and D is permanent and known because the ratio depends on only the known variables $\alpha$ and $\beta$.

For the same reason as described above, the moving locus 1410' in the abnormal state is permitted to translate on the diagram of FIG. 4 so as to cross the first tilting origin mark array 1201 at the intersection point A.

For this reason, the distances between the intersection points at which the moving locus 1410' in the abnormal state crosses the second tilting origin mark array 1203, the reference origin mark array 1202, and the first tilting origin mark array 1201 can be reduced to the ratio of distances ($d'(\alpha)$ and $d'(\beta)$) between the distances AB and BD between the intersection points. Since the distances $d'(\alpha)$ and $d'(\beta)$ can be obtained by the method according to the first example of this example embodiment, the deviation angle $\gamma$ can eventually be calculated by $$\gamma = \arctan \frac{\cot\beta \cdot \left\{ d'(\beta) - \frac{\tan\beta}{\tan\alpha} d'(\alpha) - \tan\beta \Delta H \right\}}{d'(\alpha) + d'(\beta)} \quad (2)$$

In FIG. 4 and equation (2), the moving locus 1410' in the abnormal state already deviates by $\gamma$ at a high probability when an abnormality is suspected. For this reason, the Y-coordinate value of the intersection point A between the first tilting origin mark array 1201 and the moving locus 1410' is reliable. Hence, since the ratio of $d'(\alpha)$ to $d'(\beta)$ is correct, though it is impossible to rely on the values $d'(\alpha)$ and $d'(\beta)$ themselves, the deviation angle $\gamma$ can thus be obtained.

If the value of the acquired angle $\gamma$ exceeds a predetermined threshold, it may mean that the deviation with respect to the deviation angle $\gamma$ in the normal state cannot be permitted. In this case, the operator of the linear scale or the user of the external displacement detection device incorporating the linear scale is notified of this and promoted to take a predetermined maintenance action.

<Second Example of First Example Embodiment>

In this example embodiment, origin information for the Y-axis can be generated using the origin mark array for the X-axis. Defining the linear scale 1000 shown in portions 1a and 1b of FIG. 1 as the first example of the first example embodiment, the arrangement of a linear scale according to the second example of this example embodiment is shown in FIG. 2.

As the characteristic features of the arrangement of the linear scale according to the second example, an origin mark array region 1200 is arranged in the Y-axis direction (that is, to the upper side on the sheet surface of FIG. 2), a scale grid region 1050 and the origin mark array region 1200 are sequentially arranged, and a grid read head 1120 and an origin mark array read head 1110 are arranged in this order.

By the characteristic features of the linear scale according to the second example, all the effects obtained by the first example and the first example modification can be achieved.

In addition, since the linear scale according to the second example has an L shape, as compared to the linear scale according to the first example, it is sometimes advantageous from the viewpoint of the space factor.

<Advantages of First and Second Examples of First Example Embodiment>

According to the device and the linear scale 1000 according to the above-described first example embodiment, (1) the position detection device according to the first example embodiment includes the tilting origin mark array in addition to the reference origin mark array for the linear scale capable of detecting a position displacement in one direction (for example, X direction). When the linear scale is applied to an application field in which the scale with the read head to do read in the X direction is moved in the Y direction perpendicular to the X direction, the absolute position of a Y-direction displacement can be detected as in a case in which the origin mark in the Y direction is provided.

(2) To achieve the object, the displacement device according to the first example embodiment need only output an incremental signal that notifies a relative displacement in the X direction, a reference origin detection signal, and a tilting origin mark detection signal detected at an unknown Y-coordinate position, and can implement and constitute a linear scale unit having a potential for development as a system.

(3) A displacement detection system to which the displacement detection device of (2) or a linear scale is connected can convert the incremental signal, the reference origin detection signal, and the tilting origin mark detection signal into a Y-direction absolute position by a simple calculation, and can constitute and implement a simple two-dimensional scale displacement detection device.

(4) In the modification example of each of the first and second examples, the second tilting origin mark array is further provided, thereby detecting an unexpected tilt of the linear scale and the unexpected tilt γ of the locus of the head. It is therefore possible to eliminate displacement measurement with a large error.

(5) The principle of the linear scale according to the first example embodiment is theoretically applicable to a magnetic type and an optical type as well. In the optical type, the linear scale is applicable to both a reflection type and a transmission type. Hence, the linear scale can be applied to systems in a broad range.

(6) The origin mark array setting region of the linear scale according to the first example embodiment can be arranged in an adjacent region on the same plane as the linear scale or on a different plane on the upper or lower side of the linear scale plane.

Second Example Embodiment

The arrangement of a two-dimensional scale and a displacement detection device according to the second example embodiment will be described with reference to FIGS. 5 to 6B. The displacement detection system according to the second example embodiment can measure the absolute position of a displacement in each of the X and Y directions by adding a scale including a "reference origin mark array" and a "tilting origin mark array" according to the first example embodiment to a normal displacement detection system capable of detecting displacements in the X and Y directions by an incremental method using a two-dimensional scale capable of generating an incremental signal in each of the X and Y directions.

The two-dimensional scale of the displacement detection system according to the second example embodiment aims at further improving the accuracy as compared to the first example embodiment, and uses an optical phase difference method to enable displacement measurement at an accuracy of nm order. Note that the method is not limited to the optical phase difference method, and the example embodiment is also applicable to a magnetic phase difference method.

Figure 5:
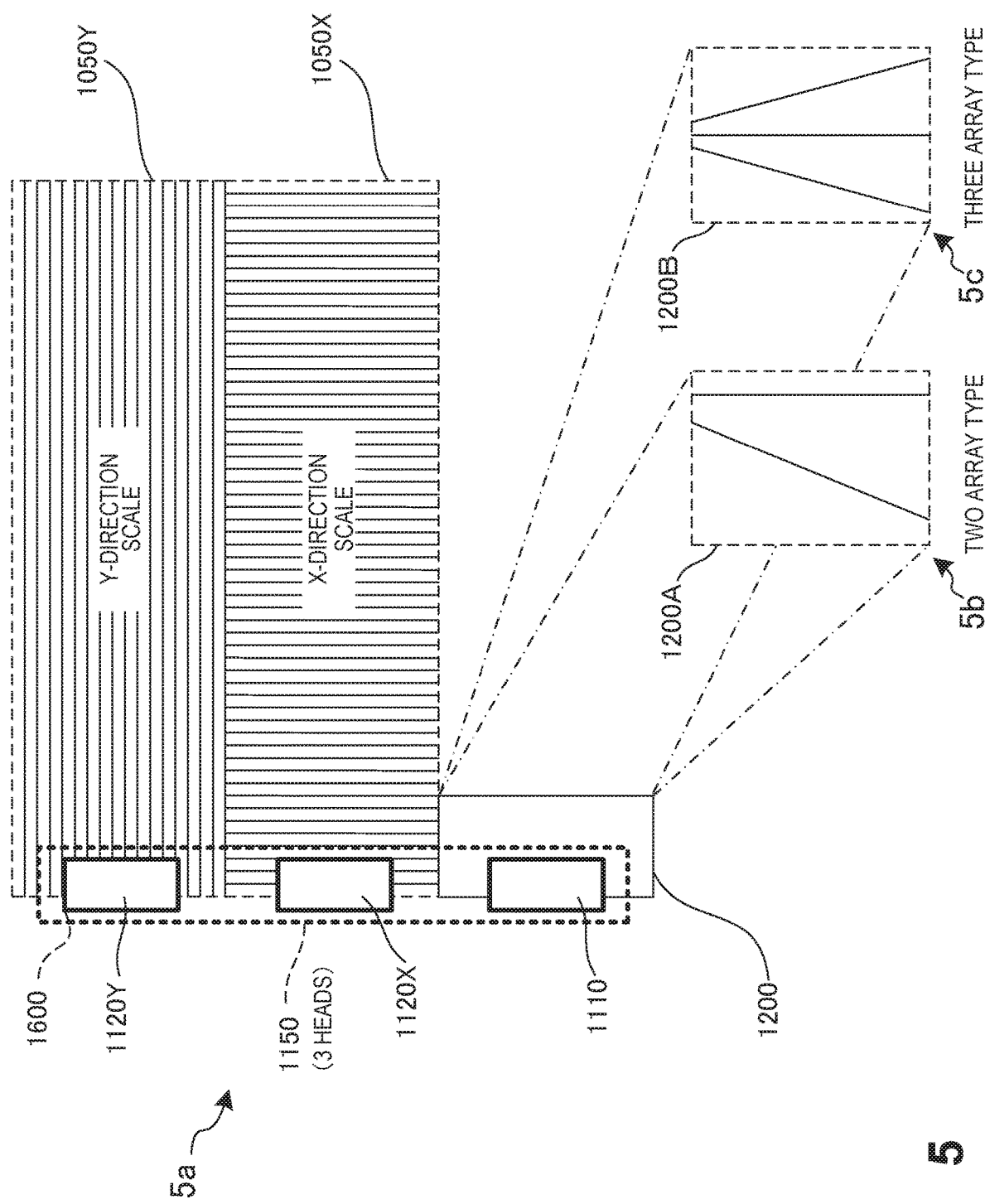
FIG. 5 is a view showing the arrangement of a scale device according to the second example embodiment in which a linear scale is provided in each of the X and Y directions.
Figure 6A:
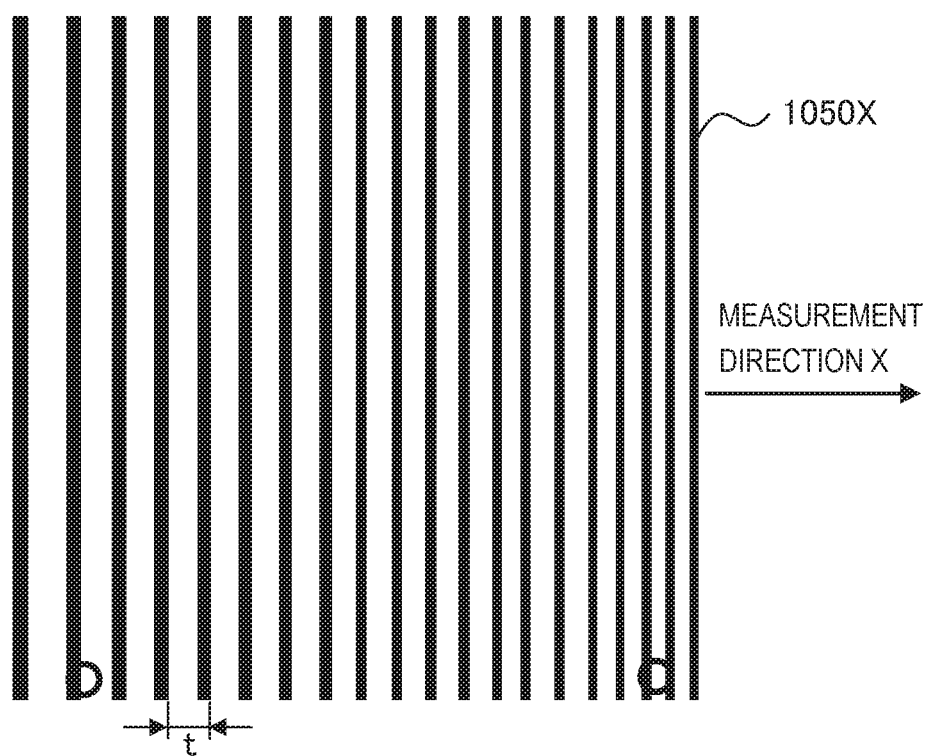
FIG. 6A is a view for explaining a state in which a grid interval is modulated in accordance with a quadratic function in the grid pattern of the scale device according to the second example embodiment.
Figure 6B:
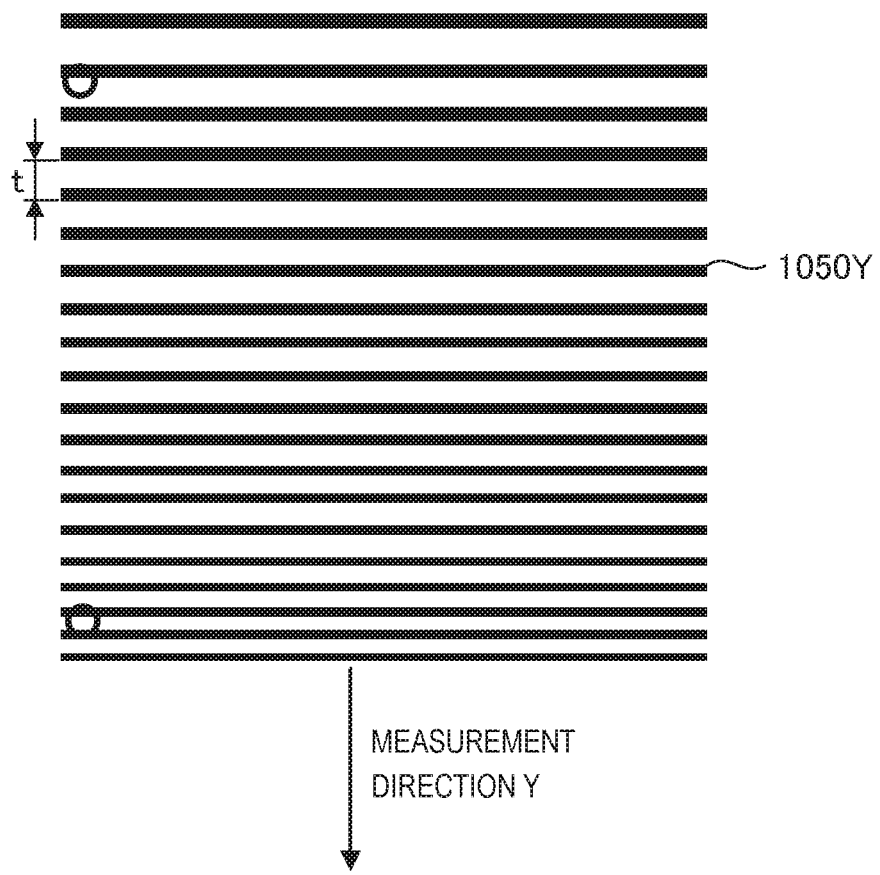
FIG. 6B is another view for explaining a state in which a grid interval is modulated in accordance with a quadratic function in the grid pattern of the scale device according to the second example embodiment.

FIG. 5 (portions 5a, 5b, and 5c) shows the arrangement of the two-dimensional scale according to the second example embodiment.

As compared to the linear scale according to the first example embodiment, the two-dimensional scale (portion 5a of FIG. 5) according to this example embodiment provides a Y-direction scale on the upper side on the sheet surface of FIG. 5, and adds a Y-grid read head 1120Y configured to scan the grid of the Y-direction scale.

As is apparent from FIG. 5, in the first example embodiment, no linear scale is provided for the Y direction. An origin mark head 1110, an X-grid read head 1120X, and the Y-grid read head 1120Y are connected to each other. When moving, they integrally move.

As is apparent from FIG. 5, the two-dimensional scale (portion 5a of FIG. 5) according to this example embodiment is further provided with the Y-direction scale, as compared to the scale according to the first example embodiment. For this reason, the scale according to this example embodiment functions as an incremental-type scale in both the X and Y directions. Additionally, since the same function as the origin read function is possible in both the X direction and the Y direction, the two-dimensional scale according to this example embodiment can provide a much higher resolution as compared to the two-dimensional scale according to the first example embodiment, which only functions as a pseudo two-dimensional scale.

That is, a head configured to read the origin mark in the Y direction can be obviated, and cost reduction and weigh reduction can be achieved.

<Modification of Second Example Embodiment>

As a modification, modulation according to a quadratic function is performed for the pitch interval of the grid. That is, when the modulation is performed for an X-direction scale 1050X shown in FIG. 5, a grid pattern shown in FIG. 6A which is suitable for the X direction and a grid pattern shown in FIG. 6B which is suitable for the Y direction are generated.

Third Example Embodiment

In the first and second example embodiments, a linear scale is employed for the scale. On the other hand, in the third example embodiment to be described below, a two-dimensional scale is used.

<Arrangement of Two-Dimensional Scale> . . . Third Example Embodiment

The scales according to the above-described first and second example embodiments use one or two linear scales. The scale according to the third example embodiment is a two-dimensional scale made of a grid of a complex shape shown in FIG. 7 or 9.

Figure 7:
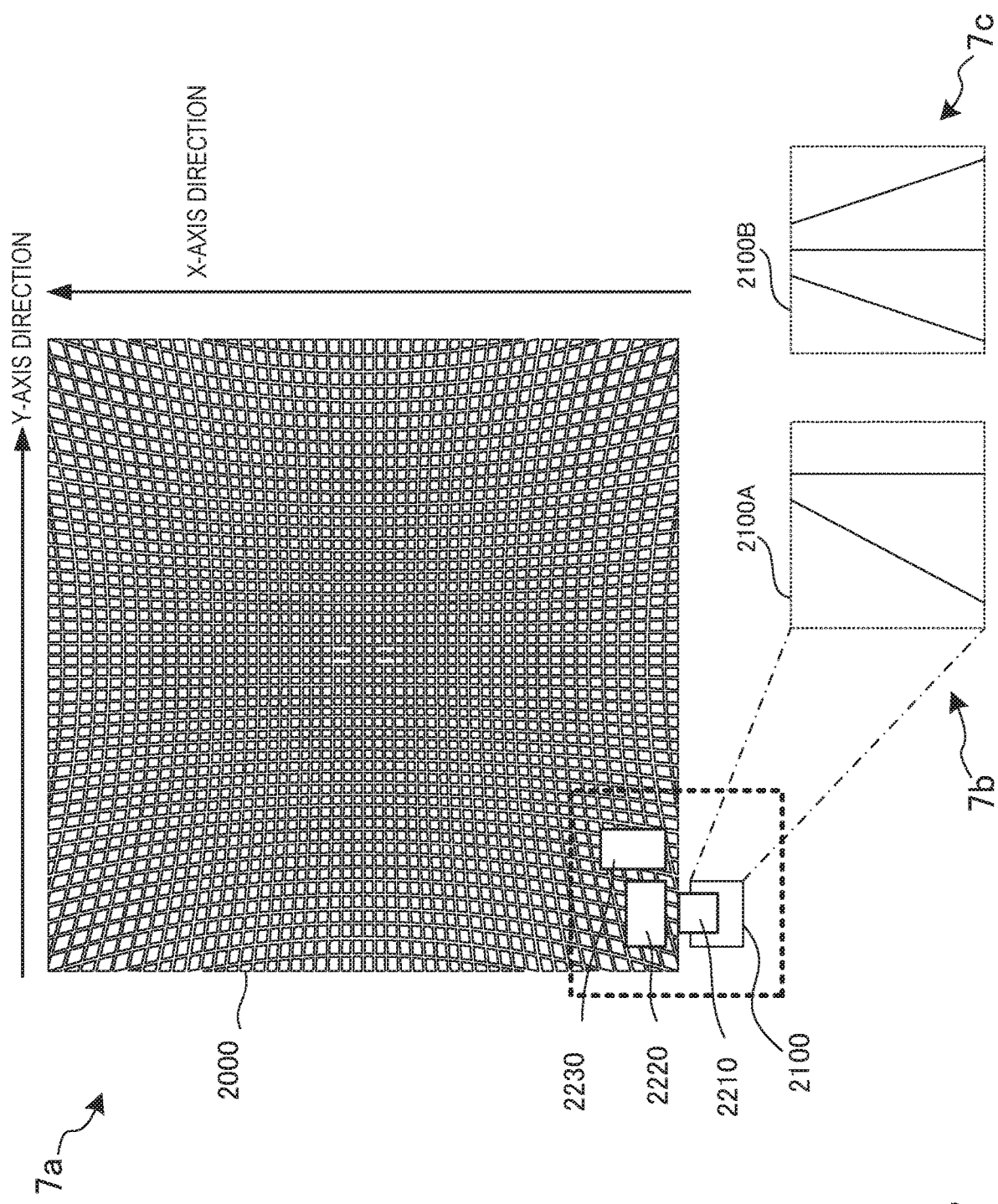
FIG. 7 is a view showing the arrangement of a scale device used in the third example embodiment.

FIG. 7 shows the arrangement of a two-dimensional scale 2000 according to this example embodiment. In the two-dimensional scale 2000 shown in FIG. 7, a number of cells are arranged in the X direction and the Y direction. A read head 2220 to be scanned in the X direction is provided on the two-dimensional scale 2000. The head 2220 optically detects an X-direction displacement on the scale 2000. In addition, a head 2230 permanently connected to the head 2220 that reads the X-direction displacement reads a Y-direction displacement on the two-dimensional scale 2000. That is, when the X-direction head 2220 displaces in the X direction, the Y-direction head 2230 moves together with the X-direction head 2220 without changing its Y-direction position. This also applies to a case in which the Y-direction head 2230 moves.

An origin mark read head 2210 is fixed to the X-direction head 2220 and the Y-direction head 2230. That is, the origin mark read head 2210 moves integrally with the remaining scale grid read heads (the X-direction head 2220 and the Y-direction head 2230), like the origin mark read head of the first and second example embodiments. In other words, the origin mark read head 2210 scans an origin mark region 2100 with an origin mark array formed on the plane.

The origin mark region 2100 according to this example embodiment has an arrangement shown in portions 7b or 7c of FIG. 7, like those of the first and second example embodiments. That is, portion 7b of FIG. 7 shows a type using two origin mark arrays, and portion 7c of FIG. 7 shows a type using three origin mark arrays.

An origin mark region 2100A shown in portion 7b of FIG. 7 aims at making it possible to read a Y-direction absolute address in the Y-axis direction without including an origin mark in the Y-axis direction and an origin mark read head, as in the first and second example embodiments.

An origin mark region 2100B aims at detecting whether the movement of the head is deviated from the X-axis.

<Reason of Grid Pattern of Two-Dimensional Scale>

In the grid pattern 2000 shown in FIG. 7 (7a), the grid pitch becomes large as the distance from the center becomes long. Such a distribution is generated because the grid pattern of the two-dimensional scale 2000 is manufactured using an exposure apparatus as shown in FIG. 8.

Figure 8:
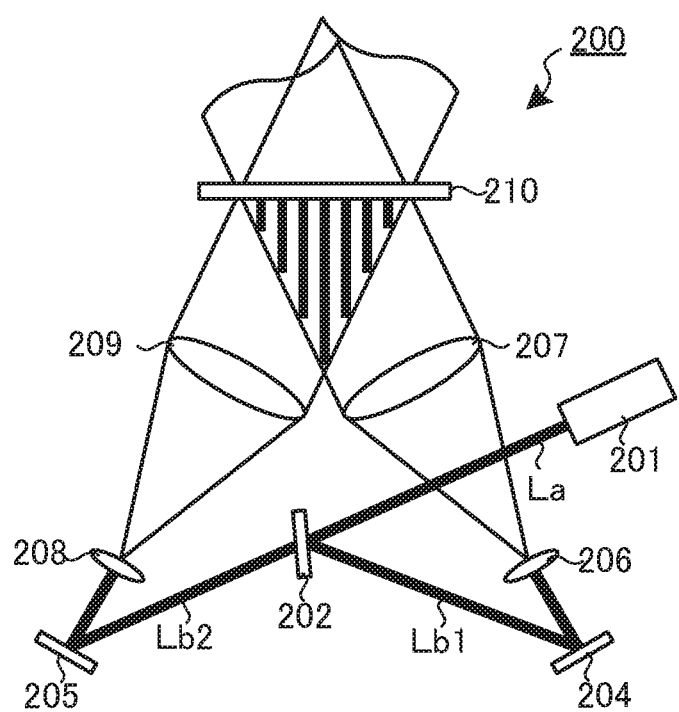
FIG. 8 is a view showing the arrangement of an exposure apparatus that forms the grid pattern of a scale used in the third example embodiment.

The exposure apparatus shown in FIG. 8 is an apparatus that exposes an interference pattern on the surface of a material with photosensitivity (to be referred to as a "photosensitive material" hereinafter) by an interference exposure method using two light beams. The interference pattern exposed on the surface of a photosensitive material 210 is the diffraction grating scale 2000.

As shown in FIG. 8, an exposure apparatus 200 is formed from a light source 201 that is a coherent light source, a distributor 202, a first mirror 204, a second mirror 205, a first lens 206, a second lens 207, a third lens 208, and a fourth lens 209.

A light beam La emitted by the light source 201 is divided by the distributor 202 into a first light beam Lb1 and a second light beam Lb2. The first light beam Lb1 enters the first mirror 204, and the second light beam Lb2 enters the second mirror 205.

The first lens 206 and the second lens 207 are arranged between the first mirror 204 and a scale 2. In addition, the third lens 208 and the fourth lens 209 are arranged between the second mirror 205 and the scale 2.

The first light beam Lb1 that has entered the first mirror 204 is reflected by the first mirror 204, and enters the surface of the photosensitive material 210 via the first lens 206 and the second lens 207. In addition, the second light beam Lb2 that has entered the second mirror 205 is reflected by the second mirror 205, and enters the surface of the photosensitive material 210 via the third lens 208 and the fourth lens 209.

The wave front of the first light beam Lb1 is converted into a plane wave by the first lens 206 and the second lens 207, and the first light beam Lb1 then enters the photosensitive material 210. In addition, the wave front of the second light beam Lb2 is converted into a plane wave having a predetermined aberration with respect to the wave front of the first light beam Lb1 by the third lens 208 and the fourth lens 209, and the second light beam Lb2 then enters the photosensitive material 210. The first light beam Lb1 and the second light beam Lb2 overlap, and an interference fringe pattern having a desired period is formed on the surface of the photosensitive material 210. Then, the surface of the photosensitive material 210 is exposed along the interference fringe pattern, thereby forming the diffraction grating scale 2000.

The first light beam can be approximated to a plane wave. In fact, the first light beam is a spherical wave. Since it is different from the plane wave, the influence of the error weakens the counting sensitivity of the count at a portion far apart from the center.

Figure 9:
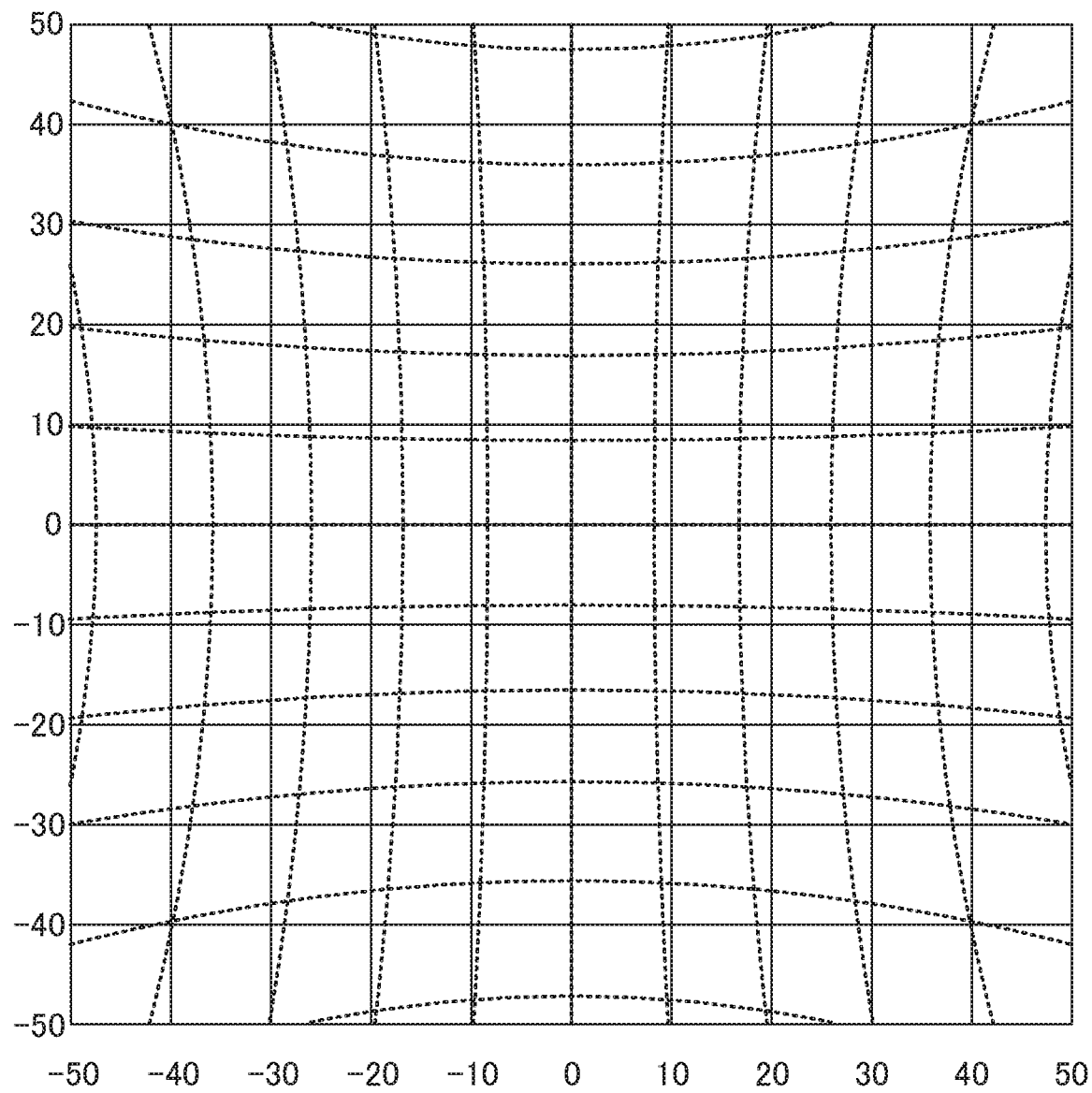
FIG. 9 is a view for explaining a state in which an error is generated between the original shape of the grid pattern used in the third example embodiment and a pattern exposed by the exposure apparatus shown in FIG. 8.

FIG. 9 explains a state in which when the exposure apparatus shown in FIG. 8 draws a square grid pattern indicated by solid lines in FIG. 9, the shape of the square grid pattern indicated by the solid lines in FIG. 9 is changed to the shape of a "distorted" grid pattern indicated by broken lines in FIG. 9 because of a diffraction phenomenon caused by the spherical wave.

That is, as for the position information of the "displacement" obtained by displacement detection of the two-dimensional scale, in which the distortion is large, and the pitch is wide at the peripheral portion, as in FIG. 9, the position information itself includes the error. The existence of the distortion in the grid pattern shown in FIG. 9 means that correction needs to be performed for the information of the displacement or position of the detection target detected by the displacement detection device.

<Displacement Detection Device> . . . Third Example Embodiment

Figure 10:
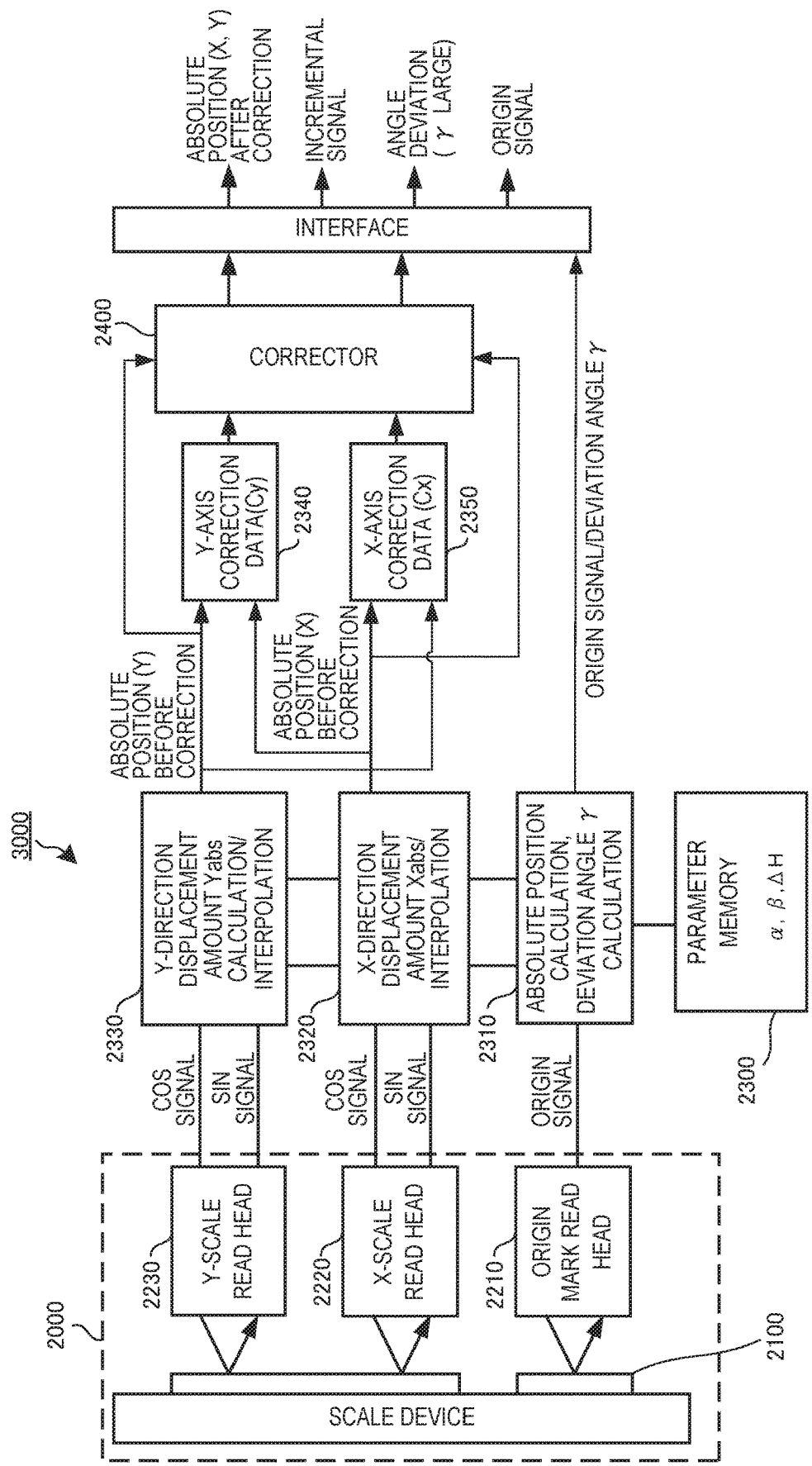
FIG. 10 is a view for explaining the principle of occurrence of a deviation in the grid pattern in the third example embodiment.

The two-dimensional scale shown in FIG. 7 and the displacement detection device (FIG. 10) incorporating the two-dimensional scale implement "correction" to cope with the above-described problem. In FIG. 10, a displacement detection device 3000 according to this example embodiment performs various kinds of processing in cooperation with the two-dimensional scale 2000 shown in FIG. 7.

As described above, the three heads (2210, 2220, and 2230) are incorporated in the two-dimensional scale 2000 that cooperates with the displacement detection device according to this example embodiment. Of these heads, the heads 2220 and 2230 include optical systems of the same arrangement, performance, and operation. Hence, the optical system shown in FIG. 11 will be described as a representative. It can be understood from the description that the head optical system substantially outputs a cos signal and a sin signal. The origin mark read head 2210 includes an optical system with one known lens.

Figure 11:
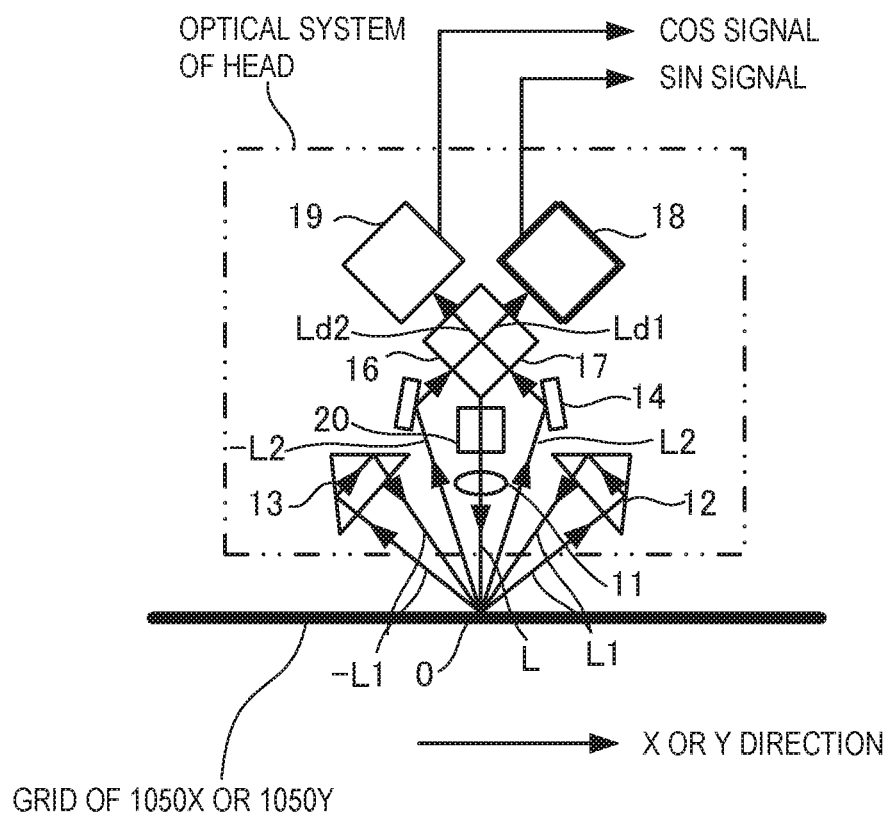
FIG. 11 is a view showing the arrangement of an optical system provided in a read head used in each of the first to third example embodiments.

In FIG. 11, the read head optical system includes a light source 20, a lens 11, two reflecting portions 12 and 13 arranged at symmetrical positions, two mirrors 14 and 16 arranged at symmetrical positions, one beam splitter 17, and two light receiving portions 18 and 19 arranged at symmetrical positions.

The light source 20 is arranged to be almost perpendicular to the two-dimensional scale grid plane. The lens 11 arranged between the light source 20 and the two-dimensional scale grid plane condenses light L emitted by the light source 20 to an arbitrary diameter. The light L emitted by the light source 20 irradiates a spot O of the diffraction grating of the two-dimensional scale grid plane via the lens 11. The light L that has irradiated the diffraction grating undergoes the first diffraction (reflection) by the diffraction grating. Accordingly, the light L that has irradiated the diffraction grating is divided into diffracted light (to be referred to as "once-diffracted light" hereinafter) L1 obtained by the first diffraction and having a positive order and once-diffracted light −L1 having a negative order.

The two reflecting portions 12 and 13 are arranged along a first measurement direction X1 such that the light source 20 is sandwiched between them. The once-diffracted light L1 diffracted by the diffraction grating once and having the positive order enters the reflecting portion 12 on the right side of the sheet surface of FIG. 11, and the once-diffracted light −L1 diffracted by the diffraction grating once and having the negative order enters the reflecting portion 13 on the left side of the sheet surface. The reflecting portion 12 reflects the once-diffracted light L1 that has entered twice in the reflecting portion 12 and makes the light irradiate the spot O of the diffraction grating again. The reflecting portion 13 reflects the once-diffracted light −L1 that has entered twice in the reflecting portion 13 and makes the light irradiate the same spot O again.

The once-diffracted light L1 having the positive order and made by the reflecting portion 12 to enter the diffraction grating again undergoes the second diffraction by the diffraction grating and exits from the diffraction grating as diffracted light (to be referred to as "twice-diffracted light" hereinafter) L2 obtained by the second diffraction and having a positive order. The once-diffracted light −L1 having the negative order and made by the reflecting portion 13 to enter the diffraction grating again undergoes the second diffraction by the diffraction grating and exits from the diffraction grating as twice-diffracted light −L2 obtained by the second diffraction and having a negative order.

The mirrors 14 and 16 are arranged along the first measurement direction X1 such that the light source 20 is sandwiched between them. The twice-diffracted light L2 having the positive order enters the mirror 14 on the right side of the sheet surface, and the twice-diffracted light −L2 having the negative order enters the mirror 16 on the left side. The mirror 14 reflects the twice-diffracted light L2 that has entered toward the beam splitter 17, and the mirror 16 reflects the twice-diffracted light −L2 that has entered toward the beam splitter 17.

The beam splitter 17 is arranged above the light source 20 on the opposite side of the diffraction grating. The beam splitter 17 overlays the two twice-diffracted light beams L2 and −L2 reflected by the first mirror 14 and the second mirror 16, thereby obtaining interference light. In addition, the beam splitter 17 splits the interference light into first interference light Ld1 and second interference light Ld2 and makes them exit. The first light receiving portion 18 is provided on the exit port of the beam splitter 17 for the first interference light Ld1, the second light receiving portion 19 is provided on the exit port of the beam splitter 17 for the second interference light Ld2. The light receiving portions 18 and 19 photoelectrically convert the optical signals and send them to the displacement detector shown in FIG. 10 via a cable (not shown) as a sin signal and a cos signal.

Referring back to FIG. 10, a sin signal and a cos signal read from the read head 2220 in the X direction are sent to an X calculator 2320, and calculation of an X-direction displacement amount, calculation of an X-direction absolute position, interpolation processing, and the like are performed. The X calculator 2320 extracts a zero-crossing position in each of the received sin signal and cos signal as an incremental signal, and calculates the X absolute position based on an X origin mark signal received from an absolute position calculator 2310.

A sin signal and a cos signal read from the read head 2230 in the Y direction are sent to a Y calculator 2330, and calculation of a Y-direction displacement amount, calculation of a Y-direction absolute position, interpolation processing, and the like are performed.

An origin signal detected by the origin mark read head 2210 is sent to the absolute position calculator 2310, and the absolute position calculator 2310 sends information representing that the absolute position is detected to the X-direction displacement amount calculator 2320 and the Y-direction displacement amount calculator 2330.

In addition, the X-direction displacement amount calculator 2320 calculates a head moving distance D[Y(n)] from the crossing position on a reference origin mark array 1202 to the crossing point on a tilting origin mark array 1201 at a Y-direction position Y(n) to obtain the absolute position in the Y direction in expression (1), sends the data to the Y-direction displacement amount calculator 2330, and causes the Y-direction displacement amount calculator 2330 to calculate the Y absolute position (Yabs).

By the cooperative operation of the three calculators, the X-direction absolute position and the Y-direction absolute position are calculated.

Note that X-direction absolute position and the Y-direction absolute position, which are calculated at this stage, are absolute positions Xabs and Yabs before the errors of the absolute positions caused by the distortion of the grid of the two-dimensional scale 2000 are corrected.

<Interpolation Processing>

Interpolation performed by each calculator in association with the sin signal and the cos signal output from the head will be described.

In FIG. 11, the light receiving portion 18 receives interference light Ld and photoelectrically converts it, thereby obtaining an interference signal $A\cos(4K\Delta x+\delta)$. A is the amplitude of interference, and K is a wave number represented by $2\pi/t$. In addition, $\Delta x$ is the moving amount of the detection head in the measurement direction X1, and $\delta$ is the initial phase. Here, the read head optical system of the displacement detection device according to this example embodiment divides, by the diffraction grating, the light L emitted by the light source 20 into the once-diffracted light L1 of the positive order and the once-diffracted light −L1 of the negative order. In addition, two diffractions (2K) are performed by the diffraction grating, and the beam splitter 17 overlays the two twice-diffracted light beams L2 and −L2

(2K+2K=4K). For this reason, the moving amount of x is multiplied by 4K, like the above-described interference signal.

Hence, when the read head optical system moves in the measurement direction X1 relative to the diffraction grating with the grid plane of the two-dimensional scale 2000, four waves, that is, light and shade of four times can be obtained by the light receiving portion 18 in correspondence with one pitch of the diffraction grating. This enables high-resolution displacement detection.

Note that a signal obtained by the light receiving portion 19 has a phase difference of 90° with respect to the interference signal obtained by the light receiving portion 18. A sin signal and a cos signal can thus be obtained. The sin signal and the cos signal are output to the Y-direction displacement amount calculator 2330 of the displacement detection device 3000 and the like, as described above.

<Absolute Position Calculation in Y Direction>

As one of the characteristic features of the first to third example embodiments, the origin mark in the Y direction is not detected, and the Y-direction displacement amount calculator 2330 only calculates the incremental signal. That is, the Y-direction displacement amount calculator 2330 can calculate the position Y(n) at relative n positions for each discrete position of the incremental signal. Additionally, since the Y-direction displacement amount calculator 2330 can perform the interpolation operation based on the sin signal and the cos signal, not only a low-resolution Y position detected by cross processing but also a Y position calculated by the interpolation can be calculated as a discrete coordinate value of a relative position.

For the specific relative position Y(n), the origin signal detector 2310 can calculate the absolute position of Y(n) in accordance with expression (1).

The deviation between the relative position Y(n) and the absolute position Yabs(n) does not vary for any value n. For this reason, when the absolute position calculator 2310 obtains the deviation amount with respect to the Y-direction relative position when the Y-direction absolute position is calculated, and applies the deviation amount to another Y-direction relative position, the absolute position Yabs based on the relative position in the Y direction can be obtained.

<Correction of Absolute Position>

In the two-dimensional scale according to this example embodiment, the shape of the grid is modulated by quadratic function approximation, as shown in FIG. 9. Hence, by the modulation, the grid shape has an error to a theoretical value. The error is included in the sin signal and the cos signal detected by the three heads. This error is also included at the XY absolute position output from the calculator, and it is essential to remove the error.

A corrector 2400 according to this example embodiment performs correction for absolute position data by the error.

Figure 12A:
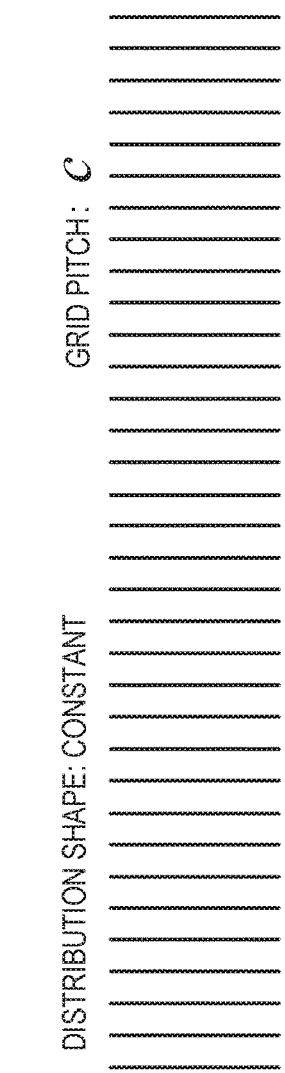
FIG. 12A is a view for explaining the cause of occurrence of an error in the third example embodiment.
Figure 12A:
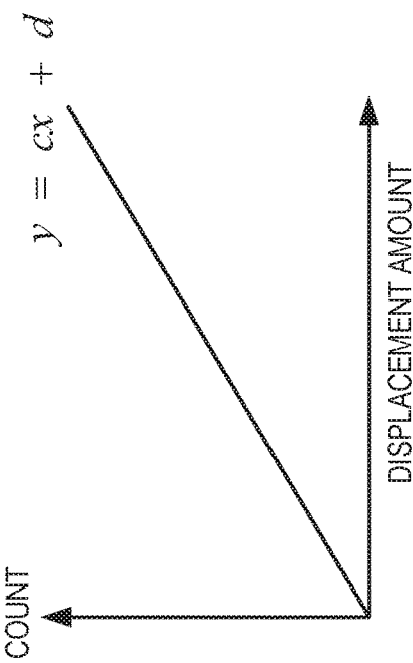
Figure 12B:
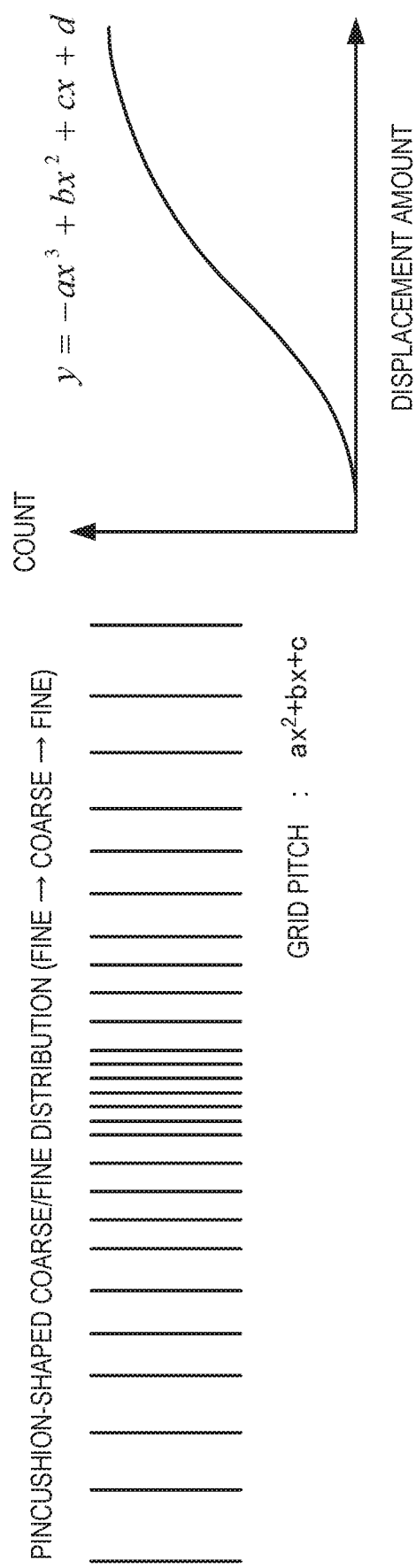
FIG. 12B is another view for explaining the cause of occurrence of an error in the third example embodiment.

The cause of occurrence of an error will be explained with reference to FIGS. 12A and 12B. A state in which the grid pitch of a grid having a grid pitch of a predetermined value C is modulated, by diffraction by a spherical wave, by a quadratic function $$ax^2+bx+c$$

$$ay^2+by+c \quad (3)$$

will be described with reference to FIGS. 12A and 12B. In other words, when the grid having the predetermined pitch C shown in FIG. 12A is modulated in accordance with equations (3), the pitch of the grid is modulated by the quadratic function and deformed into a pincushion shape as shown in FIG. 12B. The pincushion shape is the distorted shape indicated by the broken lines in FIG. 9. The square two-dimensional grid pattern indicated by the solid lines in FIG. 9 corresponds to FIG. 12A, and the distorted grid pattern indicated by the broken lines in FIG. 9 corresponds to the grid of the pincushion-shaped distribution pattern shown in FIG. 12B. Note that the approximation function has been described as the form of the pincushion-shaped quadratic function. However, any other function form may be used. For example, a barrel-shaped quadratic function with a fine/coarse/fine distribution may be used (the coefficient of the quadratic term is negative).

FIG. 9 conceptually explains the correction method.

That is, in FIG. 9, the coordinates on the two-dimensional scale, which are counted by an increment of 10 are plotted. Actually, at the central position (10, 10), the coordinate values are (10, 10) on the linear scale but (8, 8) on the two-dimensional scale. This means that the coordinates counted as X=10, and Y=10 on the two-dimensional scale correspond to a coordinate position of X=8, and Y=8 on the linear scale. This is equivalent to performing mapping and conversion of the scales of the coordinate axes of the coordinate system using the quadratic function representing the spherical wave.

More specifically, since the two-dimensional scale has two coordinate axes and therefore has two types of scales (an X scale and a Y scale), the scale value (the distance of one scale) of each of the X scale and the Y scale is corrected.

Referring back to FIG. 10, X-direction correction value data Cx is stored in a memory 2350 in advance, and Y-direction correction value data Cy is stored in a memory 2340 in advance. Each of the memories 2350 and 2340 includes a memory address counter in the column (vertical) direction and an address counter in the row (horizontal) direction, like a normal memory. In this example embodiment, the X and Y directions and the row and column directions are not associated at all. The following combinations are merely examples. That is, in the device shown in FIG. 10, Y-direction absolute position information Yabs before correction is input to the column address counter of the Y correction data memory 2340, and X-direction absolute position information Xabs before correction is input to the row address counter. Similarly, Y-direction absolute position information Yabs before correction is input to the column address counter of the X correction data memory 2350, and X-direction absolute position information Xabs before correction is input to the row address counter. In other words, both addressing of the memory 2340 for the correction data Cy and addressing of the memory 2350 for the correction data Cx are the X absolute position Xabs and the Y absolute position Yabs before correction.

Correction data read out from the (correction data) memories 2350 and 2340 of the absolute position information (Xabs, Yabs) before correction are Cx (Xabs, Yabs)

Cy (Xabs, Yabs)

The corrector 2400 calculates the absolute positions after correction in accordance with X absolute position before correction data+Cx (Xabs, Yabs)

Y absolute position before correction data+Cy (Xabs, Yabs)

Examples of the correction data memories calculated for the example of the distortion shown in FIG. 9 are shown in FIGS. 13A and 13B.

<Modification of Data Correction>

In each data memory according to this example embodiment, sampling is performed by an increment of 10. The interval can be made finer or coarser in accordance with a desired resolution. Note that although the two-dimensional scale exposed by the spherical wave has been described above, a two-dimensional linear scale exposed by a plane wave may be used.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The disclosed embodiments are applicable to a system including a plurality of devices or a single apparatus. The disclosed embodiments are also applicable even when an information processing program for implementing the functions of example embodiments is supplied to the system or apparatus directly or from a remote site. Hence, embodiments of the present invention also incorporate the program installed in a computer to implement the functions of the disclosed embodiments by the computer, a medium storing the program, and a WWW (World Wide Web) server that causes a user to download the program.

Especially, embodiments of the present invention incorporate at least a non-transitory computer readable medium storing a program that causes a computer to execute processing steps included in the above-described example embodiments.

What is claimed is:

1. A scale device comprising:
   a linear scale that is scanned and generates a signal for detecting a coordinate position in an X-axis direction;
   a reference origin mark array that is an origin mark array in which a plurality of origin marks that are detected to generate a reference origin signal representing a coordinate origin of an X-axis, the reference origin mark array extending on a second plane parallel to a first plane formed by the linear scale and extending in a Y-axis direction orthogonal to the X-axis direction;
   a first tilting origin mark array provided while extending at a tilting angle so as to be non-parallel to the reference origin mark array on the second plane; and
   a read head that scans on the linear scale, the read head sequentially crossing the reference origin mark array and the first tilting origin mark array and reading the origin marks on the reference origin mark array along with a movement.

2. The device according to claim 1, wherein the second plane on which the origin mark array and the first tilting origin mark array extend is on the same plane as the first plane on which the linear scale is formed.

3. The device according to claim 2, wherein since the second plane on which the origin mark array and the first tilting origin mark array extend is, at one of an upper position and a lower position, parallel to and spaced apart from the first plane on which the linear scale is formed, a moving operation of the read head according to reading of the linear scale does not interfere with the moving operation of the read head according to reading of the reference origin mark array and the first tilting origin mark array.

4. The device according to claim 3, wherein the linear scale comprises an optical linear scale that detects an interference phase difference.

5. A two-axis displacement detection device to which a scale device of claim 4 is connected,
   wherein when a read head scans a linear scale in an X-axis direction, the read head outputs a relative position information signal representing a current scan position in the X-axis direction, and the read head is movably arranged at an arbitrary Y-coordinate position in a Y-axis direction, and
   the two-axis displacement detection device comprises;
   a unit that counts a relative distance between a set of a reference origin mark and a tilting origin mark at an arbitrary Y-axis position by scanning, at the arbitrary Y-coordinate position, between a reference origin mark array and a first tilting origin mark array in the X-axis direction; and
   a unit that calculates an absolute Y-axis position at the arbitrary Y-axis position in accordance with the relative distance between the set of the reference origin mark and the tilting origin mark at the arbitrary Y-axis position.

6. The device according to claim 5, further comprising:
   a memory that stores, at a time of manufacture of the linear scale, correction data that corrects an error that is an error caused by a manufacturing tolerance of the linear scale and an error of the relative position information signal output from the read head; and
   a corrector that converts the relative position information signal of the X-axis and/or the Y-axis detected by the read head by scanning the linear scale into an absolute position information signal of the Y-axis in accordance with an origin signal of the X-axis and/or the Y-axis detected by the read head by reading out the reference origin mark array and the first tilting origin mark array, reads out correction data represented by the absolute position information signal using the converted absolute position information signal as an address signal for the memory, applies the readout correction data to the converted absolute position information signal and corrects the absolute position information signal, and outputs the absolute position information signal after the correction.

7. The device according to claim 6, wherein a second tilting origin mark array that is non-parallel to each of the first tilting origin mark array and the reference origin mark array and tilts with respect to the reference origin mark array further extends on the linear scale, and
   the two-axis displacement detection device further comprises:
   a unit that calculates two relative distances between the reference origin mark array and the first tilting origin mark array and the second tilting origin mark array;
   a memory unit that stores the two relative distances measured at a predetermined point of time in advance; and
   a unit that determines, based on the two relative distances calculated at an arbitrary point of time and the two relative distances stored in the memory at the predetermined point of time, whether one of the read head and the linear scale tilts with respect to the X-axis.

8. The device according to claim 7, wherein the predetermined point of time is a point of time when it is confirmed that both of the read head and the linear scale do not tilt with respect to the X-axis.

9. A two-axis displacement detection device to which a scale device of claim 3 is connected,
wherein when a read head scans a linear scale in an X-axis direction, the read head outputs a relative position information signal representing a current scan position in the X-axis direction, and the read head is movably arranged at an arbitrary Y-coordinate position in a Y-axis direction, and
the two-axis displacement detection device comprises;
a unit that counts a relative distance between a set of a reference origin mark and a tilting origin mark at an arbitrary Y-axis position by scanning, at the arbitrary Y-coordinate position, between a reference origin mark array and a first tilting origin mark array in the X-axis direction; and
a unit that calculates an absolute Y-axis position at the arbitrary Y-axis position in accordance with the relative distance between the set of the reference origin mark and the tilting origin mark at the arbitrary Y-axis position.

10. A two-axis displacement detection device to which a scale device of claim 2 is connected,
wherein when a read head scans a linear scale in an X-axis direction, the read head outputs a relative position information signal representing a current scan position in the X-axis direction, and the read head is movably arranged at an arbitrary Y-coordinate position in a Y-axis direction, and
the two-axis displacement detection device comprises;
a unit that counts a relative distance between a set of a reference origin mark and a tilting origin mark at an arbitrary Y-axis position by scanning, at the arbitrary Y-coordinate position, between a reference origin mark array and a first tilting origin mark array in the X-axis direction; and
a unit that calculates an absolute Y-axis position at the arbitrary Y-axis position in accordance with the relative distance between the set of the reference origin mark and the tilting origin mark at the arbitrary Y-axis position.

11. The device according to claim 1, wherein since the second plane on which the origin mark array and the first tilting origin mark array extend is, at one of an upper position and a lower position, parallel to and spaced apart from the first plane on which the linear scale is formed, a moving operation of the read head according to reading of the linear scale does not interfere with the moving operation of the read head according to reading of the reference origin mark array and the first tilting origin mark array.

12. The device according to claim 1, wherein the linear scale comprises an optical linear scale that detects an interference phase difference.

13. A two-axis displacement detection device to which a scale device of claim 1 is connected,
wherein when a read head scans a linear scale in an X-axis direction, the read head outputs a relative position information signal representing a current scan position in the X-axis direction, and the read head is movably arranged at an arbitrary Y-coordinate position in a Y-axis direction, and
the two-axis displacement detection device comprises;
a unit that counts a relative distance between a set of a reference origin mark and a tilting origin mark at an arbitrary Y-axis position by scanning, at the arbitrary Y-coordinate position, between a reference origin mark array and a first tilting origin mark array in the X-axis direction; and
a unit that calculates an absolute Y-axis position at the arbitrary Y-axis position in accordance with the relative distance between the set of the reference origin mark and the tilting origin mark at the arbitrary Y-axis position.

14. The device according to claim 13, further comprising:
a memory that stores, at a time of manufacture of the linear scale, correction data that corrects an error that is an error caused by a manufacturing tolerance of the linear scale and an error of the relative position information signal output from the read head; and
a corrector that converts the relative position information signal of the X-axis and/or the Y-axis detected by the read head by scanning the linear scale into an absolute position information signal of the Y-axis in accordance with an origin signal of the X-axis and/or the Y-axis detected by the read head by reading out the reference origin mark array and the first tilting origin mark array, reads out correction data represented by the absolute position information signal using the converted absolute position information signal as an address signal for the memory, applies the readout correction data to the converted absolute position information signal and corrects the absolute position information signal, and outputs the absolute position information signal after the correction.

15. The device according to claim 14, wherein a second tilting origin mark array that is non-parallel to each of the first tilting origin mark array and the reference origin mark array and tilts with respect to the reference origin mark array further extends on the linear scale, and
the two-axis displacement detection device further comprises:
a unit that calculates two relative distances between the reference origin mark array and the first tilting origin mark array and the second tilting origin mark array;
a memory unit that stores the two relative distances measured at a predetermined point of time in advance; and
a unit that determines, based on the two relative distances calculated at an arbitrary point of time and the two relative distances stored in the memory at the predetermined point of time, whether one of the read head and the linear scale tilts with respect to the X-axis.

16. The device according to claim 15, wherein the predetermined point of time is a point of time when it is confirmed that both of the read head and the linear scale do not tilt with respect to the X-axis.

17. The device according to claim 16, further comprising:
a memory that stores correction data that corrects absolute position information for the X-axis and/or the Y-axis; and
an addressing circuit that accesses the memory.

18. The device according to claim 13, wherein a second tilting origin mark array that is non-parallel to each of the first tilting origin mark array and the reference origin mark array and tilts with respect to the reference origin mark array further extends on the linear scale, and
the two-axis displacement detection device further comprises:
a unit that calculates two relative distances between the reference origin mark array and the first tilting origin mark array and the second tilting origin mark array;

a memory unit that stores the two relative distances measured at a predetermined point of time in advance; and a unit that determines, based on the two relative distances calculated at an arbitrary point of time and the two relative distances stored in the memory at the predetermined point of time, whether one of the read head and the linear scale tilts with respect to the X-axis.

19. The device according to claim 18, wherein the predetermined point of time is a point of time when it is confirmed that both of the read head and the linear scale do not tilt with respect to the X-axis.

20. The device according to claim 13, further comprising:

a memory that stores correction data that corrects absolute position information for the X-axis and/or the Y-axis; and an addressing circuit that accesses the memory.

* * * * *